United States Patent
Rau et al.

(10) Patent No.: US 7,246,439 B2
(45) Date of Patent: Jul. 24, 2007

(54) PROCESS FOR MECHANICALLY FORMING UNDERCUTS ON SINTERED SHAPED PARTS BASED ON IRON

(75) Inventors: Günter Rau, Füssen (DE); Lorenz Sigl, Lechaschau (AT)

(73) Assignee: PMG Fuessen GmbH, Fuessen (DE)

( * ) Notice: Subject to any disclaimer, the term of this patent is extended or adjusted under 35 U.S.C. 154(b) by 490 days.

(21) Appl. No.: 10/690,003

(22) Filed: Oct. 21, 2003

(65) Prior Publication Data

US 2004/0086413 A1    May 6, 2004

(30) Foreign Application Priority Data

Oct. 30, 2002   (DE)  ............................... 102 50 432

(51) Int. Cl.
    *B21D 53/28*      (2006.01)
    *B22F 1/00*      (2006.01)
(52) U.S. Cl. ................... 29/893.35; 29/893; 419/33
(58) Field of Classification Search ............... 29/893, 29/893.3, 893.35, 893.37, 463, 469; 192/108, 192/69.9, 114 T; 419/33, 44, 26, 28, 38
See application file for complete search history.

(56) References Cited

U.S. PATENT DOCUMENTS

| | | | | |
|---|---|---|---|---|
| 1,935,965 A | * | 11/1933 | Wahlberg | ................ 192/69.9 |
| 3,537,558 A | * | 11/1970 | Bibbens | ................ 192/114 T |
| 4,181,210 A | * | 1/1980 | Bibbens | ................ 192/114 T |
| 5,096,037 A | | 3/1992 | Knoess et al. | |
| 5,453,242 A | | 9/1995 | Knoess | |
| 5,701,574 A | * | 12/1997 | Derflinger et al. | ............ 419/26 |
| 6,357,272 B1 | | 3/2002 | Sandner | |

FOREIGN PATENT DOCUMENTS

| | | |
|---|---|---|
| DE | 38 39 800 A1 | 5/1990 |
| DE | 42 11 319 C2 | 10/1993 |
| DE | 43 22 083 A1 | 1/1995 |
| EP | 0 370 562 B1 | 5/1990 |
| EP | 0 389 024 A1 | 9/1990 |
| EP | 0 550 877 A1 | 7/1993 |
| WO | 99/22890 | 5/1999 |

* cited by examiner

*Primary Examiner*—John Hong
(74) *Attorney, Agent, or Firm*—Laurence A. Greenberg; Werner H. Stemer; Ralph E. Locher

(57) ABSTRACT

A relatively economical process allows producing sintered shaped parts, such as sliding sleeves in motor vehicle transmissions. Open-pored undercut surfaces are formed at an internal toothing by hypocycloid milling of the part prior to its final hardening.

8 Claims, No Drawings

PROCESS FOR MECHANICALLY FORMING UNDERCUTS ON SINTERED SHAPED PARTS BASED ON IRON

BACKGROUND OF THE INVENTION

Field of the Invention

The invention relates to a process for producing a hardened, substantially annular sintered shaped part based on iron with high-strength internal toothing, with undercuts in the tooth flank region and with functional recesses in the toothing region. The production process comprises the steps of powder pressing, sintering, mechanical forming of the undercut, and hardening of the shaped part material.

Shaped parts of this type are used in transmissions, for example as sliding sleeves in manual transmissions of motor vehicles.

In the prior art, sliding collars or sliding sleeves have only been produced at a commercial level by machining from round steel blanks produced by melt metallurgy. The material-removing manufacture of internal toothing, i.e. toothing lying inside the hollow shaped part, e.g. on an inner side of the ring, is particularly cost-intensive. The configuration of undercuts is an important factor in determining the costs of the internal machining operations. The term undercut on surfaces is to be understood as meaning the formation of surface recesses which, in the case of annular components, cannot be produced with the tool fed toward the workpiece axially parallel with the ring axis, but rather require the tool to move radially outward from a position on the ring axis into the workpiece.

Therefore, for cost reasons, undercuts in annular mass-produced parts, such as sliding sleeves in motor vehicle transmissions, are in a few instances produced by hobbing but are mainly produced by rolling back with plastic displacement of material out of the undercut region. This has often resulted in different degrees of undesired geometric deformation, the formation of burrs or beads in the region of the tooth, which then have to be eliminated by way of a dedicated working step, reaming.

To avoid the formation of burrs and beads and therefore the reaming step, it has been proposed, according to European patent application EP 0 550 877 A1, instead of producing undercuts by rolling or standard hobbing, for the cycloid or hypocycloid milling process, which is described in more detail in that document, to be employed. The milling operation described therein is distinguished by the fact that a special end mill or slotting mill is fed toward the workpiece on defined cyclic paths, which is supposed to result in the workpiece being shaped into its desired dimensions without the formation of burrs and at the same time with good process economics.

The above statements should be viewed against the background that, for example for tooth regions in transmission components, very high demands are imposed on dimensional accuracy and on the mechanical strength of the material.

As an alternative to the production of shaped parts of the type described in the introduction from melted and forged round blanks, it has also been proposed to produce shaped parts of this type by powder-metallurgy processing. In addition to general cost benefits introduced by the use of the sintering technology, there is a promise of additional benefits being drawn from the residual porosity of the material which is customary in sintered parts.

Transmission components usually run in a pool of oil. The porosity of the material in the surface region of tooth flanks can act as an oil reservoir and should ensure sufficient lubrication under high contact pressure between sets of toothing which mesh with one another.

Although it is nowadays possible to produce complex workpiece shapes by way of powder pressing and sintering in "net shape" quality without the need for subsequent shaping machining, powder pressing technology reaches its limits where surfaces are to be formed approximately perpendicular to the powder pressing direction. Surfaces of this nature, such as for example the above-mentioned undercuts, are therefore formed on the finished sintered part by rolling or some other form of plastic deformation of the material of the shaped part. However, as explained above, this is regularly associated with local displacement of plasticized material of the shaped part. To do this, free spaces are created in the component preform by means of design measures, and the plasticized material, which is harmless to the functional surfaces of the component, can then be pushed into these free spaces. On account of their residual porosity, sintered shaped parts theoretically offer the additional benefit of possible compression as a result of the pore volumes being filled up. However, in each of the processes which have been individually described thus far, contrary to statements made in connection therewith, in practice disadvantageous dimensional changes and the formation of beads have occurred.

Reference is had, in this context, to German patent application DE 38 39 800 A1 and European patent application EP 1 027 179 A1. Therefore, during production of the shaped parts described in the introduction, subsequent reaming of the tooth surfaces after rolling cannot be avoided in view of the high requirements imposed on dimensional accuracy.

The formation of undercuts in the sintered shaped parts by rolling has further drawbacks. On account of material flow, the pores have been closed up in the surface zone of the rolled tooth surfaces, thereby eliminating the above-mentioned advantage of oil lubrication and oil displacement. The reaming step also reduces the size of or closes up the pores at the surface of sintered parts.

This therefore cancels out the advantage of transmission components formed by sintering of utilization of the open surface porosity as an oil reservoir.

To enable sintered shaped parts to acquire a higher mechanical strength, they are case-hardened, preferably by gas carburization. Especially in the particular application of iron-based sintered shaped parts as a transmission component, the elimination of the open porosity has a further serious drawback since a component with a reduced surface porosity or even a total absence of surface porosity makes effective, uniform surface hardening by means of gas case hardening following the sintering process considerably more difficult.

The abovementioned components are required to have their highest mechanical strength in the region of the tooth flanks. This is the area which in the case of rolling is far less readily accessible to subsequent gas hardening, as a result of the surface pores being closed up, than surface regions with a homogenous pore structure. In particular inhomogenous hardening resulting from different levels of closed pores, however, lead to extremely undesirable stresses and to distortion in the component.

Irrespective of the rolling difficulties outlined above, the average person skilled in the art would not have considered the forming of undercuts in sintered shaped parts by means of machining a usable alternative. Proposed solutions went in other directions.

For example, commonly assigned U.S. Pat. No. 5,096,037 and European patent application EP 0 389 024 A1 describe the production of a sintered shaped part of the type described in the introduction by way of the separate pressing of two part-rings followed by joining by sintering. On account of the shaped part being suitably divided in two, in this case it was possible to press the undercut directly from powder. One drawback of this process is the complex operation of joining the two part-rings.

SUMMARY OF THE INVENTION

It is accordingly an object of the invention to provide a method for mechanically forming undercuts and recesses in sintered shaped parts based on iron which overcomes the above-mentioned disadvantages of the heretofore-known devices and methods of this general type and which provides for a process that allows effective and economic production of undercuts on sintered shaped parts with internal toothing of the type described in the introduction. The porosity which is customarily present after sintering of shaped parts based on iron can be retained so completely in the region of the surface zones even after the undercut has been formed in a single working step that additional hardening by gas treatment is ensured at least in the region of the tooth flanks and that furthermore, in the case of sintered shaped parts which are used in transmissions, sufficient lubrication is ensured by inclusions of oil in the surface pores of tooth flanks of sets of toothing which roll along one another.

With the foregoing and other objects in view there is provided, in accordance with the invention, an improved method for producing a hardened and/or hard-sintered, annularly axially symmetrical sintered shaped part based on iron with internal toothing, including undercuts in a tooth flank region and, optionally, functional recesses in a tooth region. The manufacturing sequence includes the steps of powder pressing, sintering, mechanical forming of the undercuts, and hardening. The improvement comprises: producing undercuts with open-pored surfaces on the shaped part by milling prior to hardening the shaped part or on a pre-sintered shaped part.

In accordance with invention, the milling cutter axis is moved on a hypocycloid path defined with cusps and a contact cutting action is effected in a region of the cusps; and the shaped part is simultaneously rotated about its axis.

In other words, the objects of the invention are achieved by way of a process in which the undercuts with open-pored surfaces are produced on the unhardened shaped part by means of milling, with the milling cutter axis moving on a hypocycloid path with a contact cutting action occurring in the region of the points of the path, and with the shaped part simultaneously rotating about its axis.

In accordance with an added feature of the invention, the pressed part is pre-sintered at temperatures of <900° C., then the pre-sintered part is machined by milling, and then it is fully sintered, and in the process hardened, at temperatures of between 1000° C. and 1400° C.

In accordance with an additional feature of the invention, an iron-based alloy containing ≧0.2% of C is used, and the part is fully sintered at temperatures of between 1100° C. and 1250° C.

The same sintering temperature range is also proper when, in accordance with another feature of the invention, the Fe-based alloy contains ≧0.4% of C.

In accordance with a further feature of the invention, the part is hardened by rapidly cooling from a sintering temperature during the step of fully sintering.

In accordance with again an added feature of the invention, the method comprises forming the part with an Fe-based alloy containing <0.3% of C, fully sintering the pressed part to form the finished shaped part under standard conditions, then machining the part by milling, and finally hardening the part, at least in a surface zone thereof, by case-hardening in a carbon-containing atmosphere.

In accordance with a preferred embodiment of the invention, the undercuts are formed with a single-tooth milling cutter with an integer ratio between a mill revolution time through one cycloid path and one rotation of the part about the axis thereof.

In accordance with again another feature of the invention, the method comprises milling the part with a milling tool holder equipped with a tool for milling the undercut and with a dedicated tool for milling the functional recess.

With the above and other objects in view there is also provided, in accordance with the invention, a sliding sleeve for a motor vehicle transmission, comprising a sintered shaped part produced in accordance with the method of claim 1.

Other features which are considered as characteristic for the invention are set forth in the appended claims.

Although the invention is illustrated and described herein as embodied in a process for mechanically forming undercuts on sintered shaped parts based on iron, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of a specific embodiment that represents applicants' best mode of carrying out the invention.

DETAILED DESCRIPTION OF THE PREFERRED EMBODIMENTS

A primarily important feature of the invention is the production of the undercut on a shaped part by way of the above-mentioned hypocycloid milling process, so that in terms of the object of the invention the results achieved would be inconceivable using a standard milling process, e.g. standard hobbing.

With regard to milling, it is very generally the case that the rotational movement of a moving cutter with a simultaneous relative movement between the tool and the workpiece results in chip formation, which is inevitably associated with plastic deformation of the material in the cutting zone, both in the chip and also at the machined workpiece surface.

However, the milling process which is important to the invention only has these drawbacks to a relatively insignificant degree. The details of execution of the process and its usability for forming undercuts on tooth flanks of internal toothing are described in more detail in the above-mentioned European patent application EP 0 550 877 A1, the disclosure of which is herewith incorporated in its entirety.

In the process, the cutting edge of the milling tool moves on a hypocycloid path relative to the workpiece toothing. The reversal point from a radially outward milling cutter movement to a radially inward milling cutter movement, which allows the machining of workpieces with preferably a contact milling action and with relatively little deformation of material, formation of burrs and insignificant roughness in the region of the machined workpiece surface at the points on the star-shaped path, is located.

The above document does not describe or give any indication of the particular advantages of this process for the sintered shaped parts according to the invention.

In a development which was not obvious to those of skill in the pertinent art and the actual result of which was less than predictable, when the hypocycloid milling process is used in accordance with the invention in the region of the undercuts, open-pored sintered parts with, at the same time, excellent dimensional accuracy and surface properties are achieved. In the case of sintered parts based on iron with an average material strength, chips which break off at an unexpectedly short length are formed, without leaving behind any visible traces of deformation and with the porosity remaining uniform and open. This breaking of the chip makes a significant contribution to the avoidance of material which is thrown up out of the surface, the formation of burrs or distortion of dimensions. A further reason for this breaking of the chip, which is desirable with a view to achieving the desired open-pored surface, could be the vibration-damping action of porous shaped parts, even to the extent of substantially vibration-free milling.

The process according to the invention allows the production of undercuts in a single-stage process, while maintaining the open-pored nature of the machined surfaces, in a manner which is extremely economical compared to the known prior art.

To the extent that it is desirable, sintered parts with undercuts according to the invention can be case-hardened highly efficiently and with a high quality at a subsequent stage in a carbon-containing gas atmosphere. The homogeneity of the hardening process even in the machined tooth flank regions was proved. Stresses and distortion in the component caused by a reduced surface porosity or a complete absence of surface porosity were not observed.

The desired reservoir action of surface pores in the tooth flank region was confirmed when a sintered shaped part according to the invention was used in oil-lubricated transmissions.

A preferred sintered shaped part according to the invention is the sliding collar or sliding sleeve of motor vehicle transmissions. Other transmission components, such as coupling bodies, constitute further possible applications for the production in accordance with the invention.

To carry out the synchronizing and shifting function in transmissions, components such as a sliding sleeve, in addition to the toothing, have a series of different functional recesses, such as grooves and stop faces, in the toothed region. One important functional recess in sliding sleeves is the latching or retaining groove formed at a number of locations in the region of the internal toothing. Production of such grooves requires a dedicated milling operation. Hypocycloid milling is now particularly suitable for economic production of undercut and latching groove in a sliding sleeve in a single workpiece chuck in two working steps which can be carried out continuously in direct succession without the need for any expensive changeover. For this purpose, a combination tool holder is fitted in parallel with two tools which in direct succession carry out the two operations of forming an undercut and milling a latching groove using the same milling process. The "annular" sintered shaped part also encompasses designs as a hollow cylinder, a bush and other similar shapes.

The term "mechanical forming" of undercuts is to be understood as meaning all known types of subsequent production of undercuts in a solid body, unlike production by powder pressing in a suitably configured press mold.

The term "rotational movement" of the shaped part during hypocycloid milling includes both a continuous and a periodic, sudden onward movement of the shaped part through a defined angle of the orbit.

The terms "hardened" and/or "hard-sintered" and also "unhardened" and/or "presintered" material based on iron are of importance to the process according to the invention. The higher-order meaning of these terms, which are in each case used as complementary pairs, is that the process is applied to shaped parts based on iron which have a relatively high mechanical hardness, at least in those regions at which undercuts are to be mechanically formed.

However, to carry out the process which forms the characterizing part of the invention, very hard materials are relatively unsuitable for economic manufacture. Therefore, materials based on iron, the hardness of which is well below the hardness required of the finished component, can advantageously be used to carry out the process.

Those of skill in the art will have recourse to known information to implement this condition.

It is known to use various types of carbon hardening in iron-based materials. Apart from metallic alloying additions, the hardness can also be controlled by the carbon content of the iron-based material and by the formation of different metallic phases in the material. Hardening processes, such as austenite-martensite transformation, are suitable for the inventive process. One special variant is subsequent case-hardening by means of carbon-containing gases at high temperatures in surface zones of the shaped part.

Given suitable carbon contents in the ferrous material, the hardening of sintered shaped parts can advantageously be achieved by phase transformation by means of sufficiently rapid cooling at the end of the manufacturing process.

In sintering metallurgy, the means of pre-sintering to moderate material strengths and subsequent full sintering to the highest hardness and strength which can be achieved is used after an intermediate step of mechanical forming on shaped parts which have been partially strengthened and are therefore easy to machine. This process can optionally also be applied to the present invention.

We claim:

1. In a method for producing a hardened and/or hard-sintered, annularly axially symmetrical sintered shaped part based on iron with internal toothing, including undercuts in a tooth flank region and, optionally, functional recesses in the tooth region, wherein the manufacturing sequence includes the steps of powder pressing, sintering, mechanical forming of the undercuts, and hardening, the improvement which comprises:
   producing undercuts with open-pored surfaces on the shaped part by milling prior to hardening the shaped part or on a pre-sintered shaped part;
   thereby moving a milling cutter axis along a hypocycloid path defined with cusps and contact-cutting the part in a region of the cusps of the hypocycloid path; and
   thereby simultaneously rotating the shaped part about an axis of the shaped part.

2. The method according to claim 1, which comprises powder-pressing to form a pressed part, pre-sintering the pressed part at temperatures of <900° C., then machining the pre-sintered part by milling, and then fully sintering, and in the process hardening, the part at temperatures of between 1000° C. and 1400° C.

3. The method according to claim 1, which comprises forming the part with an Fe-based alloy containing ≧0.2% of C, and effecting the step of fully sintering at temperatures of between 1100° C. and 1250° C.

4. The method according to claim 1, which comprises forming the part with an Fe-based alloy containing ≧0.4% of C, and effecting the step of fully sintering at temperatures of between 1100° C. and 1250° C.

5. The method according to claim 1, which comprises hardening the part by rapidly cooling from a sintering temperature during the step of fully sintering.

6. The method according to claim 1, which comprises forming the part with an Fe-based alloy containing <0.3% of C, fully sintering the pressed part to form the finished shaped part under standard conditions, then machining the part by milling, and finally hardening the part, at least in a surface zone thereof, by case-hardening in a carbon-containing atmosphere.

7. The method according to claim 1, which comprises forming the undercuts with a single-tooth milling cutter with an integer ratio between a mill revolution time through one cycloid path and one rotation of the part about the axis thereof.

8. The method according to claim 1, which comprises milling the part with a milling tool holder equipped with a tool for milling the undercut and with a tool for milling the functional recess.

* * * * *